July 25, 1967
R. E. ERICSON
3,332,415
SELF-SEALING PRESSURE VALVE FOR INFLATABLE SPLINTS
AND OTHER DEVICES
Filed April 30, 1964
3 Sheets-Sheet 1
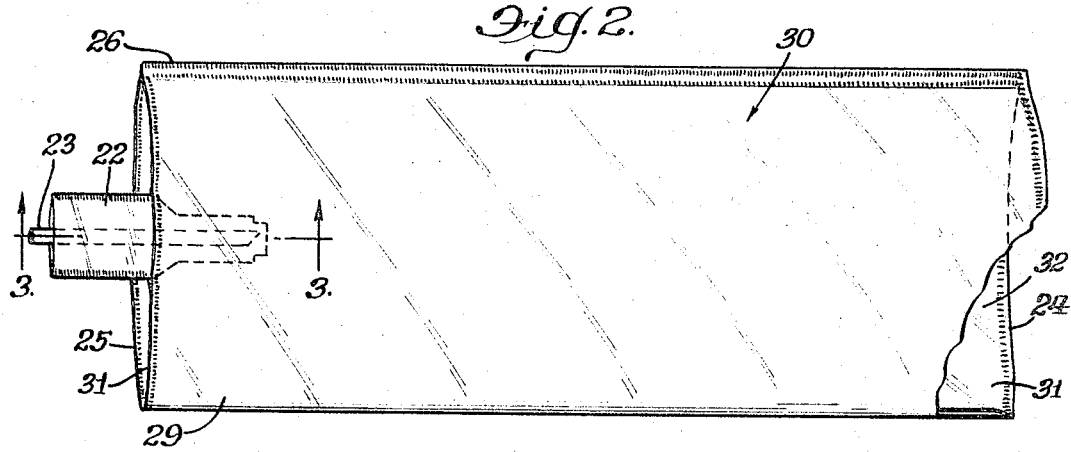
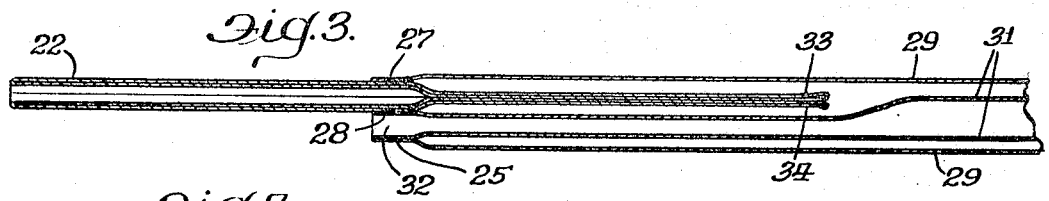
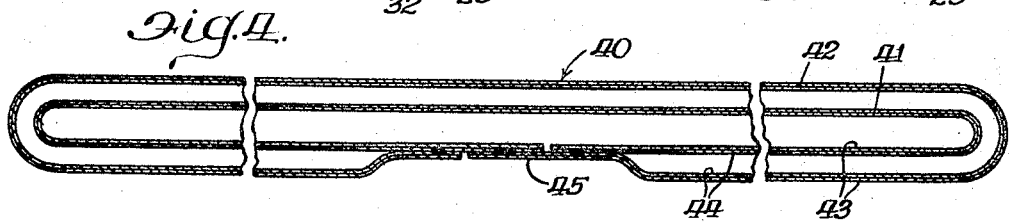
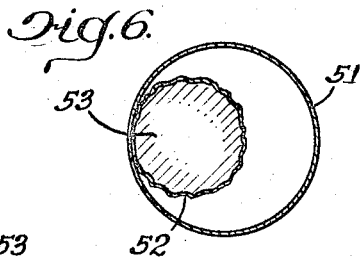
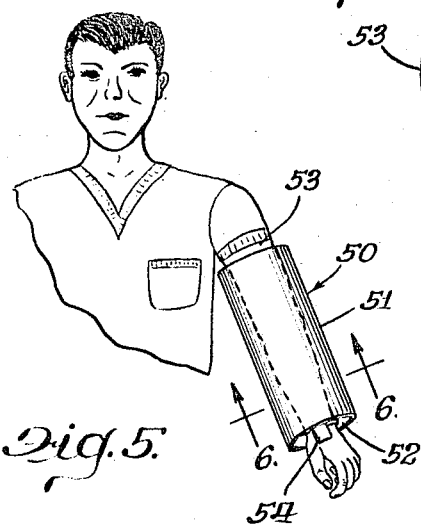
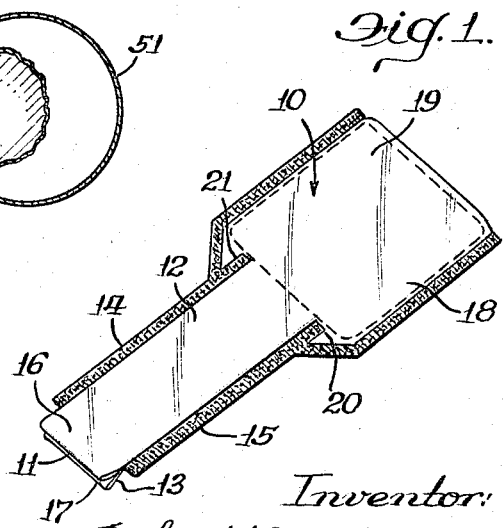
Inventor:
Richard Evan Ericson
By: James J. Fawcett
Atty.

July 25, 1967  R. E. ERICSON  3,332,415
SELF-SEALING PRESSURE VALVE FOR INFLATABLE SPLINTS
AND OTHER DEVICES
Filed April 30, 1964  3 Sheets-Sheet 2
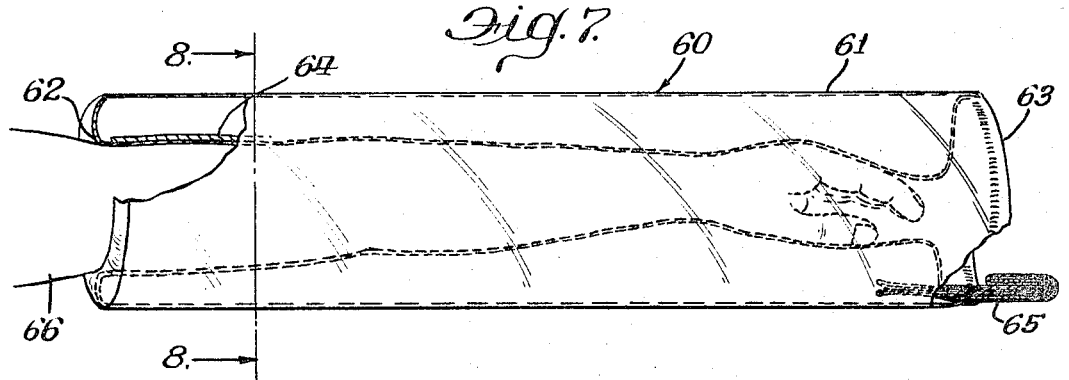
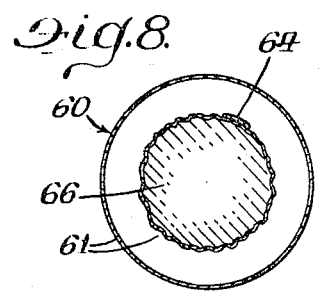
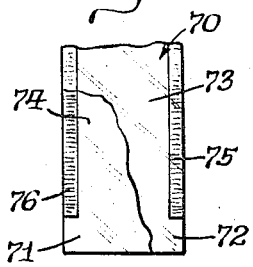
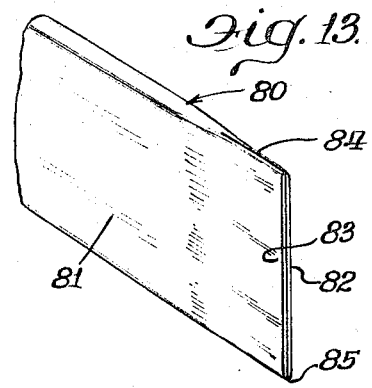
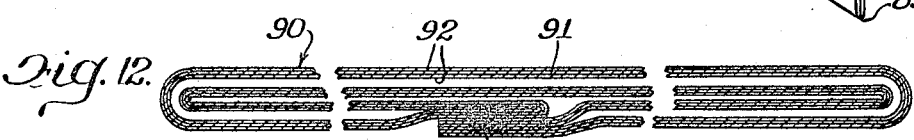
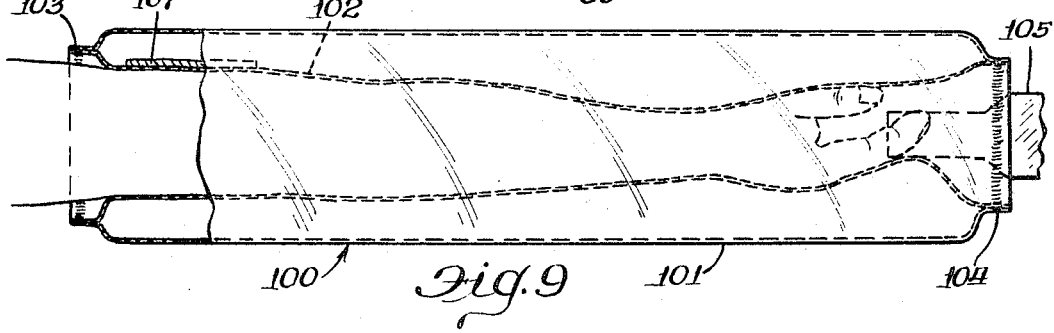
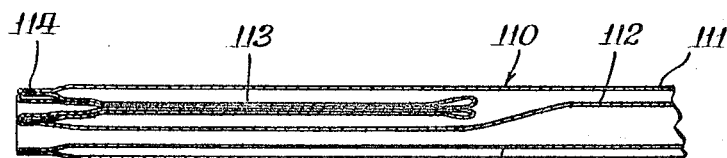
Inventor:
Richard Evan Ericson
By James J. Fawcett
Atty.

July 25, 1967  R. E. ERICSON  3,332,415
SELF-SEALING PRESSURE VALVE FOR INFLATABLE SPLINTS
AND OTHER DEVICES
Filed April 30, 1964  3 Sheets-Sheet 3
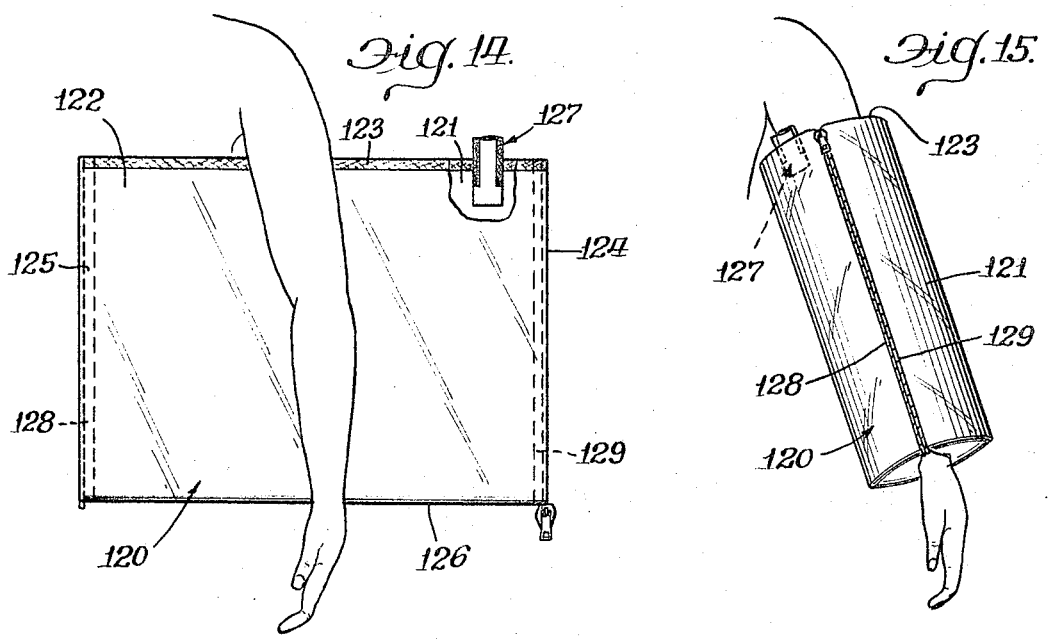
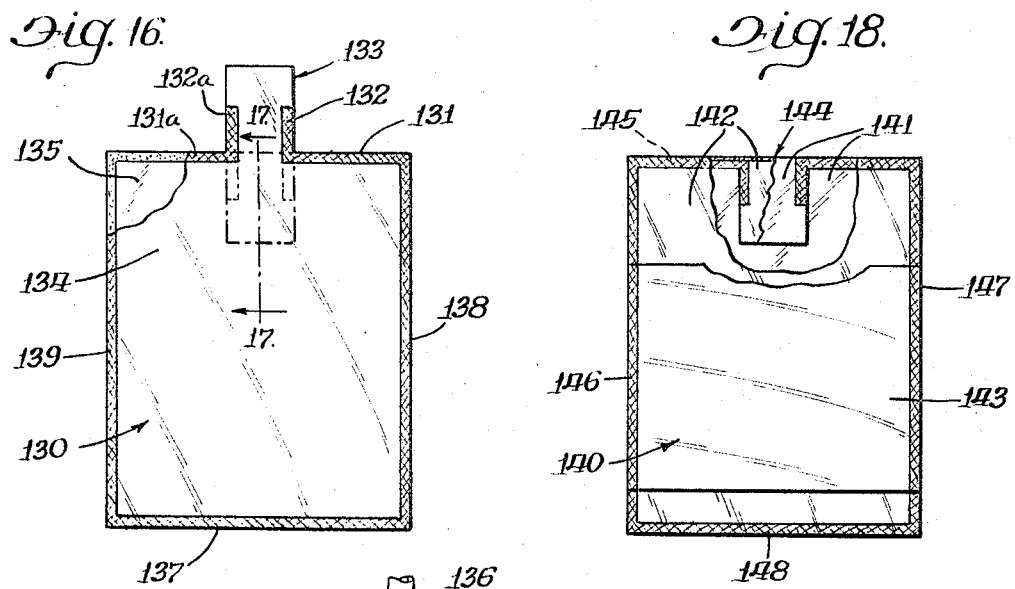
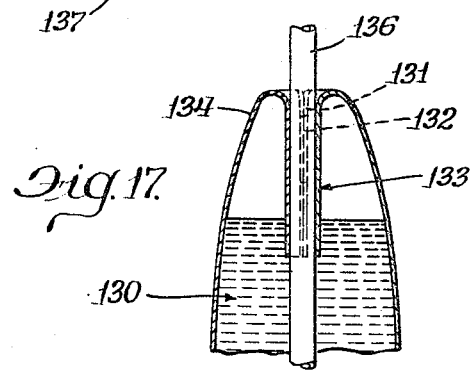
Inventor:
Richard E. Ericson
By James J. Fawcett
Atty.

United States Patent Office 3,332,415
Patented July 25, 1967

3,332,415
SELF-SEALING PRESSURE VALVE FOR INFLAT-
ABLE SPLINTS AND OTHER DEVICES
Richard E. Ericson, Barrington, Ill., assignor to The
Kendall Company, Boston, Mass., a corporation of
Massachusetts
Filed Apr. 30, 1964, Ser. No. 363,909
22 Claims. (Cl. 128—87)

This invention is concerned with self-sealing pressure valves and with fluid containers equipped with such valves. More specifically, this invention is concerned with double flap valves of the tongue type in which a normally flat slit-like channel, which may be enlarged by a filling or discharge tube, is in the absence of such a tube, closed by free tongues of opposed films which are fastened at their roots to make the slit-like channel.

Valved bags have been proposed from very early times, one of the earliest being the Lazarevitch Grain Bag which was patented in 1876 and issued as Patent No. 172,039. Starting in 1953 there has been a succession of patents dealing with such bags some of which are the Johnson Patent No. 2,640,484, issued June 2, 1953, the Smith Patent No. 2,800,269, issued July 23, 1957, the Dreyer Patent No. 2,799,314, issued July 16, 1957, a German patent to Dreyer, No. 1,095,696, issued Dec. 22, 1960, an English patent to Frankham, No. 875,848, published Aug. 23, 1961, and a recent patent to Rang, No. 3,095,023, issued June 25, 1963. But none of these references utilizes a valve similar to the valve of this invention and none have been found as simple or as effective when made by routine factory production methods.

One of the objects of this invention is the production of very inexpensive film valves which are uniformly workable in filling substantially impervious containers with fluids and retaining said fluids therein for long periods of time.

Another object of the invention is the production of containers having a simple film valve which may be used for filling, retaining and dispensing fluids from said container.

Another object is the production of an impervious package for potable beverages having a simple film valve useful in introducing said beverage into said package, retaining said beverage in said package and providing means whereby said beverage may be removed by a soda straw or other suitable tube.

An important object of the invention is the production of an air splint having a simple film valve whereby portions of animal bodies may be subjected to pressure which causes immobility and other desirable therapeutic effects when said splint is made to surround said body and then is inflated.

Referring now to the drawings:

FIGURE 1 is a typical valve of the invention.

FIGURE 2 is a typical valve of the invention applied to a pneumatic splint of the sleeve type.

FIGURE 3 is a cross section of the valve of FIGURE 2 somewhat enlarged.

FIGURE 4 is a typical pneumatic splint of the sleeve type shown in cross section to illustrate a flat seal where a laminated film of which only one layer is heat sealable is used.

FIGURE 5 illustrates a typical pneumatic splint of the sleeve type as applied to immobilize a patient's arm.

FIGURE 6 is a cross section of the splint of FIGURE 5 illustrating the usual eccentricity of the inner and outer sleeve of the splint where the latter has a longitudinal seam.

FIGURE 7 illustrates a pneumatic splint formed from a tube, one end of which was inverted and pulled over the other to create a double-walled structure without a longitudinal seam.

FIGURE 8 is a cross section of the splint of FIGURE 7 showing a plastic bar sealed to the inner tube to prevent roll-off by inversion.

FIGURE 9 is another longitudinally-seamless splint formed of two tubes and also showing a roll preventive bar.

FIGURE 10 illustrates a very simple embodiment of a valve of this invention consisting of two films sealed flatly against each other to form a channel with tongues of free film projecting in opposition from the sealed portion.

FIGURE 11 shows a portion of a typical pneumatic splint in which the valve is contained wholly within the splint proper.

FIGURE 12 illustrates a typical pneumatic splint formed of a single sheet laminate of three layers, the outer of which are heat sealable.

FIGURE 13 illustrates perhaps the most simple of the typical valves of this invention.

FIGURE 14 illustrates a pneumatic splint of the zip-up type laid flat to receive the body member.

FIGURE 15 illustrates the splint of FIGURE 14 in place with the zipper closed and with the splint inflated.

FIGURE 16 illustrates how a valved container may be made from two sheets of heat sealable material.

FIGURE 17 illustrates in cross section the valve portion of FIGURE 16 as applied to a soft drink container.

FIGURE 18 illustrates a restaining cushion made similar to the container of FIGURE 16 but with a bridge of film which restains a body member against the cushion.

The valves of this invention perhaps have their greatest utility with film containers in which fluids are retained under pressures somewhat higher than atmospheric pressure. There are a number of applications, however, in which the valve works very effectively with other containers or at pressures only slightly above atmospheric. The valve works effectively whether the container is filled with a gas or a liquid or with mixtures of the two. It also works when the channel portion is formed of films which do not lie precisely flat against one another. As a matter of fact, it is still effective when particulate material is introduced either in the presence of a gas or a liquid or both. It is axiomatic, of course, that the valve alone cannot maintain the pressure if the container is pervious to the contents to any really significant degree.

The valves of this invention may be used for air or other gas inflation of toys, athletic equipment, air mattresses, life rafts, life jackets and the like. The valve works so simply that such containers may be inflated by mouth, the limitation being on the amount of pressure one can introduce. An average man can introduce air in the range of 30–35 millimeters of mercury by means of the valve and a hollow piece of tubing.

But in addition to utility in such areas, the valve also may be used in such diverse areas as self-sealing, filling and dispensing means for potables such as milk, soft drinks and alcoholic beverages or as filling and retaining means for liquid hot or cold bags or as quick filling and air-tight retention means for ground coffee, rice, salt and the like. With particulate material, of course, the valve need not serve to empty the container but with particular constructions may do so.

But perhaps the greatest utility for the valves of this invention is in the field of body immobilization. It is known that when a portion of the human body is fitted into a surrounding double-walled flexible chamber which is inflated, the chamber becomes so rigid that the body portion is immobilized. The valve thus has a very significant application in the field of first-air immobilization and in hospital applications where temporary immobilization, prevention of embolism, control of hemorrhage, prevention of edema, application of traction and relief of pain may be areas of potential use.

Referring once more to the figures:

In FIGURE 1 a typical valve of the invention 10 consists of a tubular opening 11 extending from end to end between double thickness of thin film 12 and 13. The heat seals 14 and 15 seal the sides except at the inner end where the flaps 16 and 17 are completely free. The opening at both ends consists of folded end edges. In this particular embodiment of the valve of the invention, a malleable thin metal plate or thick foil 18 is inserted between the plies of film on one side of the tubular opening in a widened portion 19. Optionally, metallic foil may be inserted on both sides or left out entirely. The advantages of such foil inserts will be discussed later. The metallic foil 18 is held in place in this case by the heat seal stubs 20 and 21. In practice this particular embodiment is made from two pieces of flat tubular film or one piece folded transversely so that the folded edges are superimposed. The metallic foil, if any, is then inserted and the pattern heat seal made. After trimming the heat seals, the end flaps 16 and 17 are trimmed as indicated but optionally the end flaps 16 and 17 may extend out as far or farther than the heat seals so long as they are not sealed at their side edges.

In FIGURE 2, a valve 22 similar to valve 10 of FIGURE 1 but without the metallic foil insert is shown heat-sealed in place in a typical inflatable film structure of this invention, in this case an inflatable pneumatic splint 30. This particular splint is a tubular double-walled structure with an opening 32 extending through the tube. Heat sealed ends 24 and 25 and a fin type heat seal 26, joining the walls longitudinally, seal the structure. A removable tube 23 of metal, paper, glass, plastic or other material is used for inflating and deflating. The valve 22 is heat-sealed as is shown in FIGURES 2 and 3 between the outer wall 29 and the inner wall 31 with heat seals 27 and 28 which merge with heat seal end 25. In practice, the valve may be made separately in which case a thin layer of high melt material such as polytetrafluoroethylene is inserted in the tube during the period when the valve is being heat sealed into position so that the opening will not be heat sealed closed. The flaps 33 and 34 of the valve 22 are seen in FIGURE 3 to be in a position with the structure slightly inflated.

In FIGURE 4 the double-walled structure 40 is shown to be formed of two sheets 41 and 42 of a film laminate comprising an easily heat sealable layer of film 44 and a more difficultly sealable layer 43. The longitudinal flat seam 45 which is substituted for the fin type seal 26 of FIGURE 2 is obviously to be preferred. This seal 45 is formed by heat sealing the layers 44 together with the edges of sheets 41 and 42 overlapping as is indicated. This same longitudinal seam may be used with a single sheet of homogenous film or with a laminate in which both exposed sides are heat sealable. In that case a single sheet folded in the center may be used with the side edges brought together and sealed longitudinally to form a double-walled tube either with a fin seal or a flat seal.

In FIGURE 5 an inflated splint 50 is shown applied to the upper and lower arm of a patient to immobilize the elbow joint. The valve 54 is positioned between the outer tube 51 and the inner tube 52 which is seen pressed tightly around the arm 53. This is best shown in FIGURE 6 which is a cross section of the inflated splint in place taken along the lines 6—6. If the inner tube 52 and the outer tube 51 are very nearly the same size, the arm may be moved away from the longitudinal seal before the splint is inflated and the air will then surround it except for a thin inner fin connecting to the seal.

In FIGURES 7 and 8 a typical inflatable structure, again a splint 60, is shown inflated in use on an arm 66. This structure is a modification of those shown in FIGURES 2 and 4 in that the inflatable structure is formed from a single tube of film 61 inverted upon itself to form a rolled edge 62 at one end (preferably the upper end) and heat sealed with the seal 63 at the opposite end. A typical valve 65 with a metallic insert is shown with the metal folded to provide an additional safety feature to ensure leakproof operation. When tubular material is used it has a tendency to roll at the rolled edge. A longitudinal rib 64 of relatively stiff material may be heat sealed to the outer portion of the inner tube to substantially eliminate any tendency to roll.

In FIGURE 9 an inflated splint 100 formed of substantially similarly sized inner and outer tubes 101 and 102, respectively, is heat sealed at the ends 103 and 104 to form an inflatable structure. A typical valve 105 is heat sealed into place between the tubes. A rib 107 of more rigid material is heat sealed to the outside of the inner tube to alleviate the tendency to roll. Obviously, the two tubes need not be substantially similar in size if one of the tubes is gathered or one is stretched at the ends or the larger tube is shrunk or tapered to the smaller tube size at the ends.

In FIGURES 10 and 13 the inner ends of alternate valve structures are shown. Both of these structures have tubes with a single thickness of film on each side. In FIGURE 10 the inner lips 71 and 72 are shown extending freely beyond the ends of the heat seals 75 and 76 which join the films 73 and 74 together to make the tube of the valve. In FIGURE 13 the valve 80 is formed from a thin tube of film 81, the end tongues 82 and 83 are in apposition being freely movable from the root tube due to the slits 84 and 85.

In FIGURE 11 a typical splint 110 with double walls 111 and 112 has a typical valve 113 heat sealed into place between the double walls at one end. This particular adaptation of the valve does not project beyond the end of the splint end seal.

In FIGURE 12 a structure 90 is shown formed of a single sheet, a laminate consisting of a layer 91 of less readily heat sealable material with a more readily heat sealable layer 92 on each side. This is a flat seal with a folded edge sealed to the opposite side edges to form the longitudinal seam 93 of the double-walled structure 90. This structure may also be used where the sheet is a single layer of film.

In FIGURE 14 a typical inflatable splint 120 may be made from two separate sheets of heat sealable impermeable material sealed along the line 126 but preferably a single sheet is used, folded as shown along the line 126, to form two superimposed panels 121 and 122. These panels are sealed at the top by heat-seal 123 which seals the valve 127 between the panels. A ribbon of polytetrafluoroethylene is inserted in the valve channel before the seal is made thus avoiding channel closure. The panels are also sealed together along the side edges by heat-seals 124 and 125. These latter seals also seal at the respective sides the mating portions 129 and 128 of a separable type zipper.

In FIGURE 15 the splint of FIGURE 14 is shown inflated and in place on a patient's arm. This construction may be useful as an emergency splint which an injured person may apply to himself. A long flexible tube is recommended for splint inflation use in emergency kits.

In FIGURE 16 a fluid inflatable container 130 is shown in which the valve sides are integral with the container walls. In making this structure two independent panels 134 and 135 are superimposed. Each of the panels has a projecting integral tongue of material which are superimposed to form the material for the valve 133. The two panels are heat sealed across the top edge by the seals 131 and 131a except where the valve projects. The valve is further sealed at the projection edges partially along the projection length by the seals 132 and 132a. The panels 134 and 135 are then inverted and superimposed so that their former outer surfaces are now the inner surfaces and the valve 133 is between these surfaces as shown by the construction line. The edges of the superimposed panels are then sealed with seals 137, 138 and 139 to form a sealed valve container. In FIGURE 17 the container of FIGURE 16 is shown containing a potable liquid. A soda straw 136 is shown inserted through the valve. The valve will retain the liquid until the valve channel is opened by the insertion of the straw.

In FIGURE 18 a structure similar to that of FIGURE 16 is shown partially broken away to show the construction. The film sheets 141 and 142 have end projections forming the valve 144. The end of the container having the projection 144 is heat sealed to leave an open channel in the valve and also freely projecting tongues projecting beyond the seals of the valve. The film sheets are then inverted and superimposed to bring the valve between them. A bridge piece 143 is then placed on top of the superimposed panels and the bridge piece and panels are sealed by the seals 146 and 147. The bottom is also sealed with the seal 148. In practice this structure when inflated can function as a splint or a restraining device. Several bridge pieces may be heat sealed to the same cushion so that a small child or an animal whose limbs are inserted under the bridges while lying on the uninflated cushion will be restrained and cushioned when the cushion is inflated.

Where visual inspection of the inside of the pressure container is a requisite, I have found that laminates are preferred because they generally can be made thinner in view of their increased bursting strengths. Probably for splints the laminate of choice is a nylon-polyethylene laminate but very satisfactory splints can be made with a variety of laminates such as polyethylene terephthalate-polyethylene, polyvinyl chloride-polyethylene, polypropylene-polyethylene, polyvinylidene chloride-polyethylene, polyvinyl chloride acetate copolymer-polyethylene, polyvinylidene chloride copolymer-polyethylene, cellophane-polyethylene and cellophane-polyvinylidene chloride. Nylon is unusual in that grades which are heat sealable are very transparent and also strong so that nylon film may be used alone to make a transparent splint.

Other containers where visibility is not too critical may be made of polyethylene, polypropylene, rubber hydrochloride, polyvinyl chloride and the like. In general, where liquids are concerned one should choose a material with a low vapor transmission rate whereas with gases one should choose materials with low gas permeability. The examples given above are not intended to limit the invention but rather are illustrative only.

Where metal foils are used with the outer portions of valves of this invention, they serve several purposes. They tend to stay bent after bending forces are removed and thus serve to hold the outer valve channel open so that an inflating, filling or emptying tube may be readily inserted. After a container is filled and the tube withdrawn, metal foils may be doubled over several times to make certain that the valve will not leak. Actually the valve of this invention is so efficient, however, that the second function of foil portions is seldom realized.

Where comminuted materials are placed in the valved containers of this invention, a special emptying tube is sometimes helpful. This is a small funnel with a long discharge tube. If the funnel is almost as big as the channel, it may be slipped in big end first until the channel is clear and then may be used to pull the valve into a folded position. The comminuted material can then be readily poured from the container.

The valves of this invention are opened by insertion of a hollow tube into the valve channel from the outer end towards the free tongues of opposed films. When the tube has been inserted sufficiently far into the channel, the free tongues of film are forced out of apposition opening the valve. As soon as the valve opens, any pressure inside the valved container vents itself and any liquid or other contents may be sucked out of the container via the tube.

Similarly, a hollow tube is used in filling. Very ready filling may occur when the tube is attached to a reservoir with a push-up valve. Valved containers may be filled in a minimum of time because it is unnecessary to open or close the package. Air and other gases, liquids of various kinds including carbonated liquids, mixtures of gas and liquid and mixtures of granulated or comminuted materials such as salt, sugar, ground coffee, spices, small grains and the like with inert gas or with air or liquids or with mixtures of gas and liquid may be inserted through the tube with a minimum of difficulty. When the tube is withdrawn the package is sealed as the valve tongues again come into apposition.

The potable liquid container illustrated in FIGURES 16 and 17 is particularly useful in the care of hospital and nursing home patients. A number of such containers may be sterilized in the empty flat condition and then utilized to serve a number of different liquids to patients. They are invaluable for patients on liquid diets. Packages may be readily filled with milk, eggnog, bouillon, tea, coffee, fruit juice, vegetable juice, water, carbonated beverages and the like and served without danger of spilling because the package is leakproof until the moment a straw is inserted. The packages are somewhat flexible even when full and may be placed in convenient position for the patient even using his body as a support. If the package is disarranged so that the patient is left with the straw pulled from the container, the package will not leak although the straw itself may drip. When the patient wants no more liquid, he simply pulls the straw from the container and it is sealed. It may be discarded or the patient may later reopen the package with a new straw.

I claim:

1. A self-sealing pressure valve comprising flexible impervious panels joined to form a channel extending from the outside to the inside of a sealed zone, said channel terminating in a portion in which said panels are in substantial contact, the inner portion of said valve including flexible tongues freely extending from said panels inwardly beyond the end of said channel, said tongues each being formed of two integral panels forming a common loop at their inner ends, said tongues being in flat face-to-face apposition at least across the width of said channel to thereby close and seal said channel at its inner end, said valve adapted to be opened by insertion of a tubular element into said channel sufficiently far to force said tongues out of apposition, and to be automatically closed by said tongues returning in apposition upon removal of said tubular element from said channel.

2. The self-sealing pressure valve of claim 1 in which the valve is formed of flat film heat sealed to form the channel.

3. The self-sealing pressure valve of claim 1 in which the valve is formed of four panels, two on each side of the channel.

4. The self-sealing pressure valve of claim 3 in which the outer portion of the valve contains a sheet of metal foil sealed between one or more of the pairs of panels forming the channel.

5. The self-sealing pressure valve of claim 3 in which the valve is formed of two pieces of flat tubular film heat-sealed to form the channel.

6. The self-sealing pressure valve of claim 1 in combination with a container substantially impervious to fluid, said container constituting the sealed zone.

7. The self-sealing pressure valve of claim 1 in combination with a film container substantially impervious to gas, said container constituting the sealed zone.

8. The self-sealing pressure valve of claim 1 in combination with a sealed film container suitable for a mixture of liquid and gas under pressure, said container constituting the sealed zone.

9. The self-sealing pressure valve combination of claim 8 in which the mixture is a potable liquid and carbon dioxide mixture.

10. The self-sealing pressure valve of claim 1 in combination with a cushion inflatable by air, said cushion constituting the sealed zone.

11. The self-sealing pressure valve of claim 1 in combination with an inflatable toy, the interior of said toy constituting the sealed zone.

12. The self-sealing pressure valve of claim 1 in combination with the inflatable portion of a piece of athletic equipment, the interior of said inflatable portion constituting the sealed zone.

13. The self-sealing pressure valve of claim 1 in combination with the inflatable portion of marine equipment, the interior of said inflatable portion constituting the sealed zone.

14. The self-sealing pressure valve of claim 1 in combination with a substantially impervious container suitable for a mixture of gas and a comminuted solid, said container constituting the sealed zone.

15. The self-sealing pressure valve of claim 1 in combination with a substantially impervious film container adapted to form a wrap around an animal body member and inflatable to put pressure upon said member, said container constituting the sealed zone.

16. The self-sealing pressure valve combination of claim 15 in which the container is in the form of a double-walled sleeve.

17. The self-sealing pressure valve combination of claim 15 in which the container is in the form of a flat inflatable chamber capable of being wrapped about an animal body member and secured in place before inflation of said chamber.

18. The self-sealing pressure valve combination of claim 16 in which the double-walled sleeve consists of a tubular film one end of which is inverted and doubled over the other end.

19. The self-sealing pressure valve combination of claim 15 in which the film container is formed from a single sheet heat sealable on both major surfaces thereof.

20. The self-sealing pressure valve combination of claim 15 in which the substantially impervious sealed container is intended to extend only partially around the animal body which is intended to be placed between said container and a bridging sheet, said bridging sheet being fastened to said container and extending the remainder of the way around said animal body.

21. The self-sealing pressure valve of claim 1 in combination with the inflatable portion of a lighter-than-air device, the interior of said inflatable portion constituting the sealed zone.

22. A self-sealing pressure valve comprising flexible impervious panels joined to form a channel extending from the outside to the inside of a sealed zone, said channel terminating in a portion in which said panels are in substantial contact, the inner portion of said valve including flexible tongues freely extending from said panels inwardly beyond the end of said channel, said tongues being in flat face-to-face apposition at least across the width of said channel, the outer portion of said valve containing a sheet of metal foil associated with one or more of the panels forming the channel.

References Cited

UNITED STATES PATENTS

| | | | |
|---|---|---|---|
| 1,646,590 | 10/1927 | Mildenberg. | |
| 2,799,314 | 7/1957 | Dreyer et al. | 229—62.5 |
| 3,022,932 | 2/1962 | Vines | 229—62.5 |
| 3,153,413 | 10/1964 | Gottfried | 128—87 |
| 3,186,404 | 6/1965 | Gardner | 128—87 |
| 3,193,984 | 7/1965 | Schubert | 54—82 |

FOREIGN PATENTS

| | | |
|---|---|---|
| 723,588 | 2/1955 | Great Britain. |
| 875,848 | 8/1961 | Great Britain. |
| 330,696 | 7/1958 | Switzerland. |

RICHARD A. GAUDET, *Primary Examiner.*

J. W. HINEY, *Assistant Examiner.*